United States Patent
Zhang et al.

(10) Patent No.: US 11,270,200 B2
(45) Date of Patent: Mar. 8, 2022

(54) SINGLE-STEP NONLINEARITY COMPENSATION USING ARTIFICIAL INTELLIGENCE FOR DIGITAL COHERENT TRANSMISSION SYSTEMS

(71) Applicant: NEC Laboratories America, Inc., Princeton, NJ (US)

(72) Inventors: Shaoliang Zhang, Princeton, NJ (US); Fatih Yaman, Princeton, NJ (US); Ting Wang, West Windsor, NJ (US); Eduardo Rodriguez, Tokyo (JP); Yoshihisa Inada, Tokyo (JP); Kohei Nakamura, Tokyo (JP); Takanori Inoue, Tokyo (JP)

(73) Assignee: NEC Corporation

( * ) Notice: Subject to any disclaimer, the term of this patent is extended or adjusted under 35 U.S.C. 154(b) by 290 days.

(21) Appl. No.: 16/285,870

(22) Filed: Feb. 26, 2019

(65) Prior Publication Data

US 2019/0266480 A1   Aug. 29, 2019

Related U.S. Application Data

(60) Provisional application No. 62/635,191, filed on Feb. 26, 2018.

(51) Int. Cl.
| | | |
|---|---|---|
| *H04B 10/61* | (2013.01) | |
| *G06N 3/063* | (2006.01) | |
| *G06N 3/067* | (2006.01) | |
| *H04B 10/27* | (2013.01) | |
| *G06N 3/08* | (2006.01) | |
| *H04B 10/071* | (2013.01) | |
| *G06N 3/04* | (2006.01) | |

(52) U.S. Cl.
CPC ............ *G06N 3/067* (2013.01); *G06N 3/04* (2013.01); *G06N 3/08* (2013.01); *H04B 10/071* (2013.01); *H04B 10/27* (2013.01); *H04B 10/61* (2013.01)

(58) Field of Classification Search
CPC ............. H04B 10/616–6166; G06N 3/02–105
See application file for complete search history.

(56) References Cited

U.S. PATENT DOCUMENTS

| | | | | |
|---|---|---|---|---|
| 2016/0099777 A1* | 4/2016 | Liu | ............... | H04B 10/2513 398/159 |
| 2017/0163350 A1* | 6/2017 | Chien | ............... | H04B 10/6163 |
| 2018/0198547 A1* | 7/2018 | Mehrvar | ............. | H04B 10/616 |
| 2019/0132051 A1* | 5/2019 | Onuma | ............. | H04B 10/6163 |

OTHER PUBLICATIONS

C. Chuang et al., "Employing Deep Neural Network for High Speed 4-PAM Optical Interconnect," 2017 European Conference on Optical Communication (ECOC), 2017, pp. 1-3, doi: 10.1109/ECOC.2017.8346205. (Year: 2017).*

(Continued)

*Primary Examiner* — Nathan M Cors
(74) *Attorney, Agent, or Firm* — Joseph Kolodka

(57) ABSTRACT

Aspects of the present disclosure describe a method for digital coherent transmission systems that advantageously provides low-complexity, single-step nonlinearity compensation based on artificial intelligence (AI) implemented in a deep neuron network (DNN).

2 Claims, 17 Drawing Sheets

(56) References Cited

OTHER PUBLICATIONS

M. A. Jarajreh et al., "Artificial Neural Network Nonlinear Equalizer for Coherent Optical OFDM," in IEEE Photonics Technology Letters, vol. 27, No. 4, pp. 387-390, 15, Feb. 15, 2015, doi: 10.1109/LPT.2014.2375960. (Year: 2015).*

H. Ye, G. Y. Li and B. Juang, "Power of Deep Learning for Channel Estimation and Signal Detection in OFDM Systems," in IEEE Wireless Communications Letters, vol. 7, No. 1, pp. 114-117, Feb. 2018, doi: 10.1109/LWC.2017.2757490. (Year: 2018).*

Mata et al., "Artificial Intelligence (AI) Methods in Optical Networks: A Comprehensive Survey", Optical Switching and Networking, Jan. 2018; DOI: 10.1016/j.osn.2017.12.006; arXiv:1801.01704 [cs.AI]. (Year: 2018).*

* cited by examiner

SINGLE-STEP NONLINEARITY COMPENSATION USING ARTIFICIAL INTELLIGENCE FOR DIGITAL COHERENT TRANSMISSION SYSTEMS

CROSS REFERENCE TO RELATED APPLICATIONS

This application claims the benefit of U.S. Provisional Patent Application Ser. No. 62/635,191 filed 26 Feb. 2018 the entire contents of which is incorporated by reference as if set forth at length herein.

TECHNICAL FIELD

This disclosure relates generally to optical communications systems, methods, and structures. More particularly, it describes a low-complexity, single-step nonlinearity compensation (NLC) method employing artificial intelligence implemented in deep neuron networks (DNN).

BACKGROUND

As is known in the optical communications arts, optical fiber nonlinearity acts as a significant impairment of optical fiber communications and limits the maximum optical power launched into optical fiber. In response, the art has developed digital coherent technology employing digital signal processing (DSP techniques that advantageously compensate for such fiber nonlinearity in a received signal. Notwithstanding such developments, improved methods for nonlinearity compensation would represent a welcome addition to the art.

SUMMARY

An advance in the art is made according to aspects of the present disclosure directed to an improved method for nonlinearity compensation. In sharp contrast to the prior art, such method according to the present disclosure advantageously provides low-complexity, single-step nonlinearity compensation based on artificial intelligence (AI) implemented in a deep neuron network (DNN).

According to aspects of the present disclosure, we disclose an AI architecture to take both PBA triplets and transmitted/received symbols as inputs. The DNN in the AI architecture is trained to estimate the nonlinearity from these inputs and is used to compensate for fiber nonlinearity. In the AI architecture, the optimum coefficients and the best interaction between these inputs are automatically constructed in the deep-learning algorithm to minimize the training loss, thus achieving the optimum performance gain.

BRIEF DESCRIPTION OF THE DRAWING

A more complete understanding of the present disclosure may be realized by reference to the accompanying drawing in which.

Figure 1A:
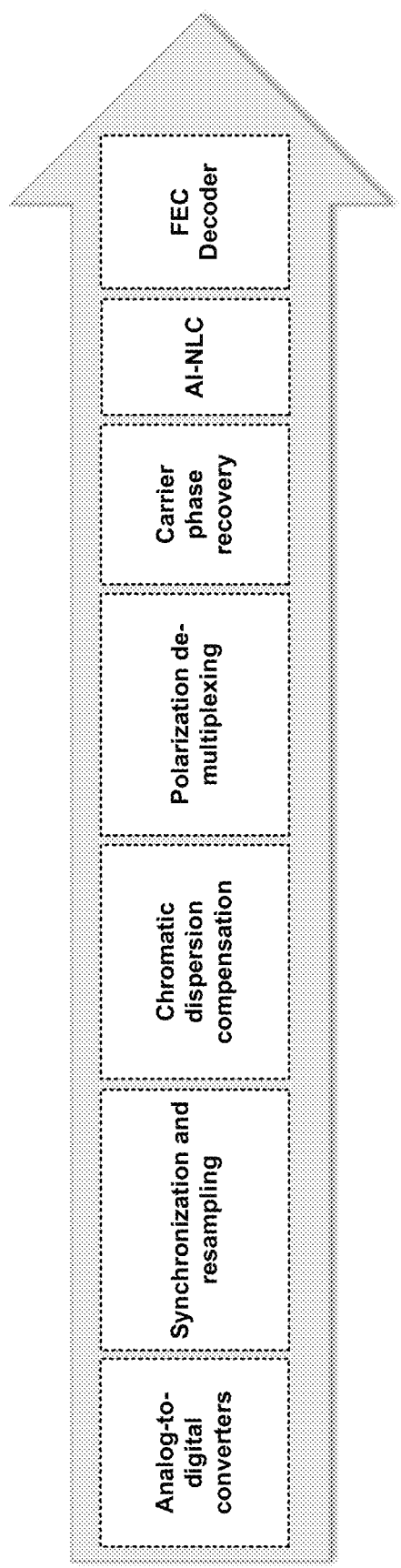
FIG. 1(A) is a schematic block diagram illustrating digital signal processing (DSP) blocks in a digital coherent receiver according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that—generally—there are two broad categories of NLC algorithms namely, perturbation-based (PBA) and digital backpropagation (DBP).

In DBP, a received signal is propagated backward digitally over an assumed virtual link which emulates the same transmission link from which the signal was received but with opposite dispersion and fiber nonlinearity coefficients. The DBP algorithm requires having twice the symbol rate resampling, and usually performs chromatic dispersion compensation and nonlinear phase rotation by multiple steps per span, thus leading to an extremely high complexity.

In PBA, the algorithm calculates coefficients associated with intra-channel cross-phase modulation (IXPM) and intra-channel four-wave mixing (IFWM) triplets based on known link parameters, such as fiber dispersion, span length and pulse shaping. Such a PBA algorithm is usually performed at a transmitter side of a transmission facility—where undistorted data is present. As will be appreciated by those skilled in the art, the effectiveness of PBA algorithm is not significant in wavelength-division-multiplexing (WDM) system.

For further understand of these developments, see, e.g., Ying Gao, John C. Cartledge, Abdullah S. Karar, Scott S.-H. Yam, Maurice O'Sullivan, Charles Laperle, Andrzej Borowiec, and Kim Roberts, "Reducing the complexity of perturbation based nonlinearity pre-compensation using symmetric EDC and pulse shaping," Opt. Express 22, 1209-1219 (2014); Ezra Ip and Joseph M. Kahn, "Compensation of Dispersion and Nonlinear Impairments Using Digital Backpropagation," J. Lightwave Technol. 26, 3416-3425 (2008); Zhenning Tao, Liang Dou, Weizhen Yan, Lei Li, Takeshi Hoshida, and Jens C. Rasmussen, "Multiplier-Free Intrachannel Nonlinearity Compensating Algorithm Operating at Symbol Rate," J. Lightwave Technol. 29, 2570-2576 (2011); and T. Oyama et al., "Robust and efficient receiver-side compensation method for intra-channel nonlinear effects," OFC 2014, San Francisco, Calif., 2014, pp. 1-3

According to aspects of the present disclosure, we disclose an AI architecture to take both PBA triplets and transmitted/received symbols as inputs. The DNN in the AI architecture is trained to estimate the nonlinearity from these inputs and is used to compensate for fiber nonlinearity. In the AI architecture, the optimum coefficients and the best interaction between these inputs are automatically constructed in the deep-learning algorithm to minimize the training loss, thus achieving the optimum performance gain.

As we shall show and describe, our methods provide the following advantages—which will be readily understood and appreciated by those skilled in the art Low complexity: single-step computation over an entire optical link is only needed to compensate for fiber nonlinearity independent of length of the transmission link. Moreover, the method operates at 1 sample/symbol to reduce the number of computation steps.

High efficiency: performance improvement observed at dense WDM channel configuration at ultra-long-haul distance;

System agnostic: the method works with every system without knowing any prior parameters since training data carries all the information related to the link characteristic;

Portability: the algorithm can work at either the receiver or transmitter side, or both;

High compatibility with existing DSP architecture: it just takes the recovered constellation from carrier phase recovery block which is already present in the conventional DSP chip. The method is also compatible with the input to the next DSP block Turning now to FIG. 1(A), there is shown a block diagram of an illustrative digital coherent receiver and DSP blocks according to aspects of the present disclosure. As may be observed from that figure, such coherent receiver includes the following functional blocks: Analog-to-digital converters; Synchronization and resampling; Chromatic dispersion compensation; Polarization de-multiplexing; Carrier phase recovery and forward error correction (FEC) decoder. Interposed between the carrier phase recovery and FEC decoder is an AI-NLC which—in an illustrative embodiment—operates as 1 sample per symbol.

Figure 1B:
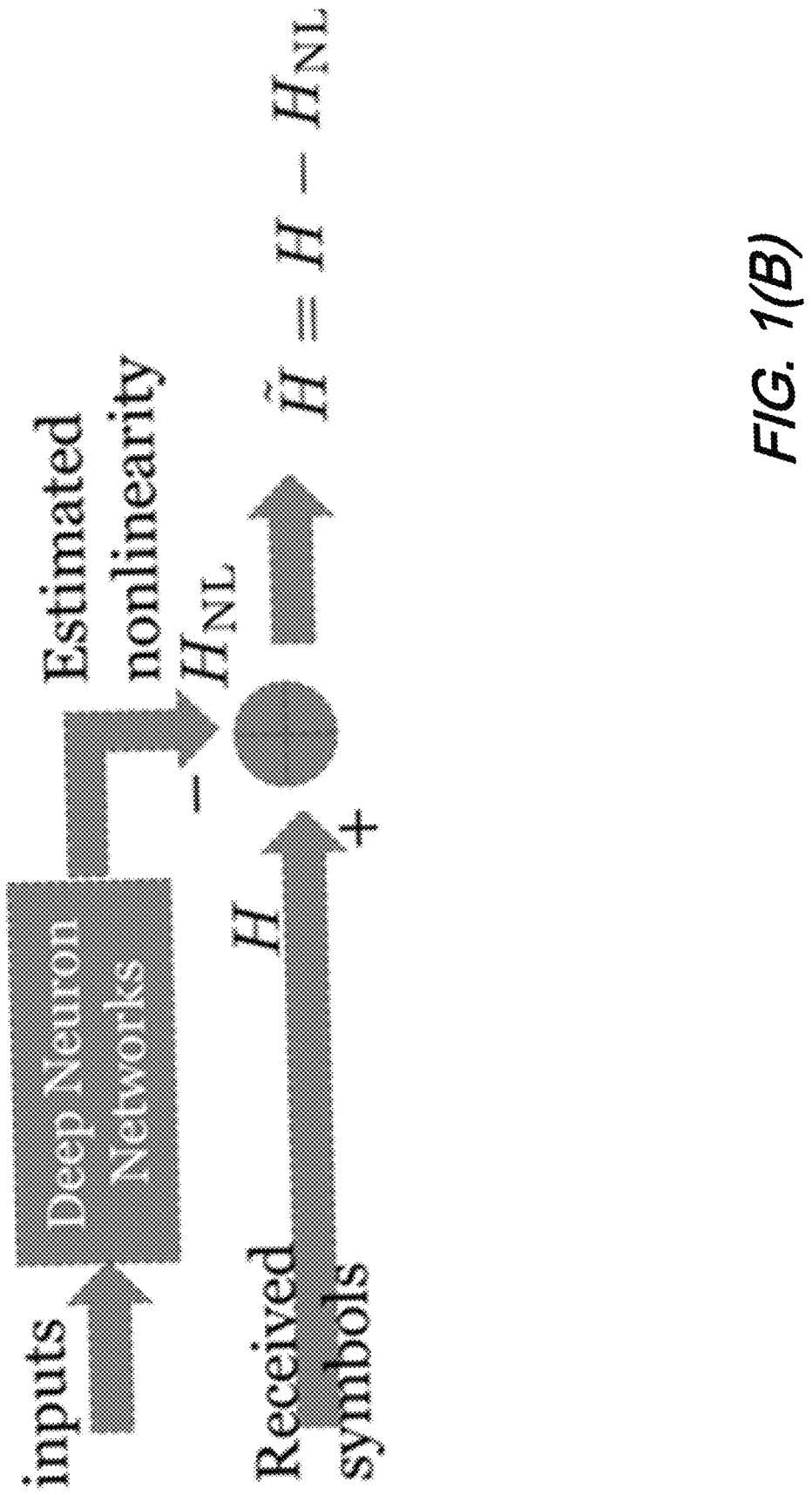
FIG. 1(B) is a schematic diagram illustrating an overview of the AI-NLC block according to aspects of the present disclosure.

Output of the carrier phase recovery block serves as the inputs to the deep neuron networks (DNN) in the AI-NLC block to estimate the nonlinearity in the received signals, as shown illustratively in FIG. 1(B)—which is a schematic diagram illustrating an operational overview of the AL-NLC block.

The recovered symbol His subtracted by the estimated nonlinearity $H_{NL}$, i.e., $\hat{H}=H-H_{NL}$. Note that even though the AI-NLC block is shown at a receiver side in FIG. 1(A), our disclosure is not so limited as it can also be implemented at the transmitter side.

Figure 2:
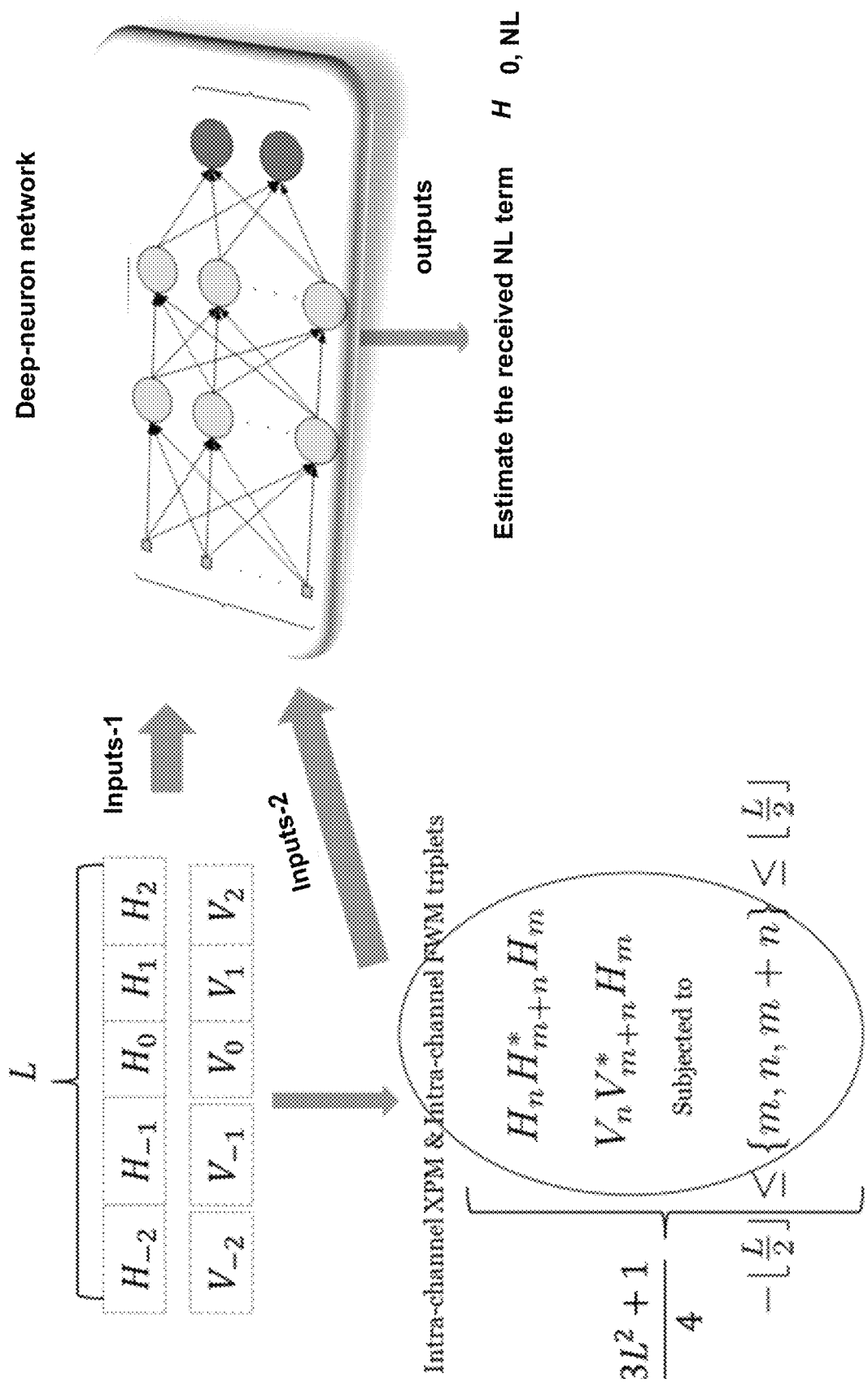
FIG. 2 is a schematic diagram illustrating preparation of inputs to the DNN architecture according to aspects of the present disclosure.

FIG. 2 is a schematic diagram illustrating the preparation of inputs to DNN namely, the methodology to determine inputs to the AI-NLC—according to aspects of the present disclosure. Note that instead of directly providing recovered symbols H in x-polarization and V in y-polarization into DNN suggested by the prior art, IXPM and IFWM triplets are determined from recovered symbols spanning a symbol window length L around the symbol of interest $H_0$. There are in total $(3L^2+1)/4$ triplets determined—based on the relationships included in the oval shown in FIG. 2. The recovered symbols H's and V's in the symbol window L together with the computed triplets are fed into DNN architecture to estimate the fiber nonlinearity in the received signal $H_0$.

Figure 3:
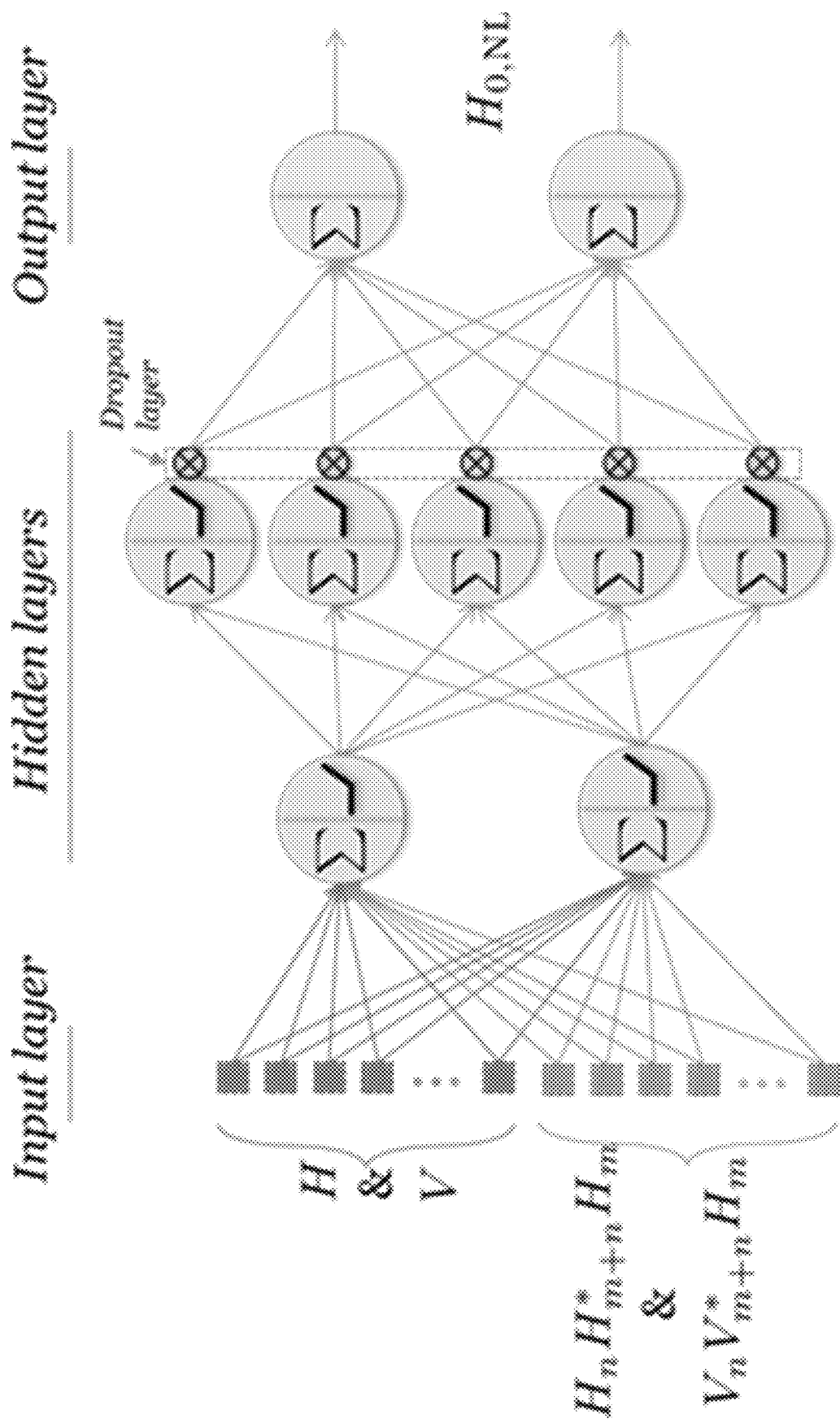
FIG. 3 is a schematic diagram illustrating DNN architecture implementation according to aspects of the present disclosure.

Turning now to FIG. 3, there is shown a schematic diagram illustrating details of DNN architecture—according to aspects of the present disclosure—to estimate the nonlinearity from the received inputs prepared according to the methodology shown illustratively in FIG. 2. Note that the number of hidden layers and the number of neurons in each layer need to be optimized to maximize the performance improvement.

With continued reference to FIG. 3, we note that 2 hidden layers with 2 and 5 neurons are shown as an illustrative example. The dropout layer after the hidden layer 2 is added to mitigate overfitting issue. The details how to implement and optimize the DNN architecture can be found in many other deep-learning documents and are skipped here for brevity.

Figure 4:
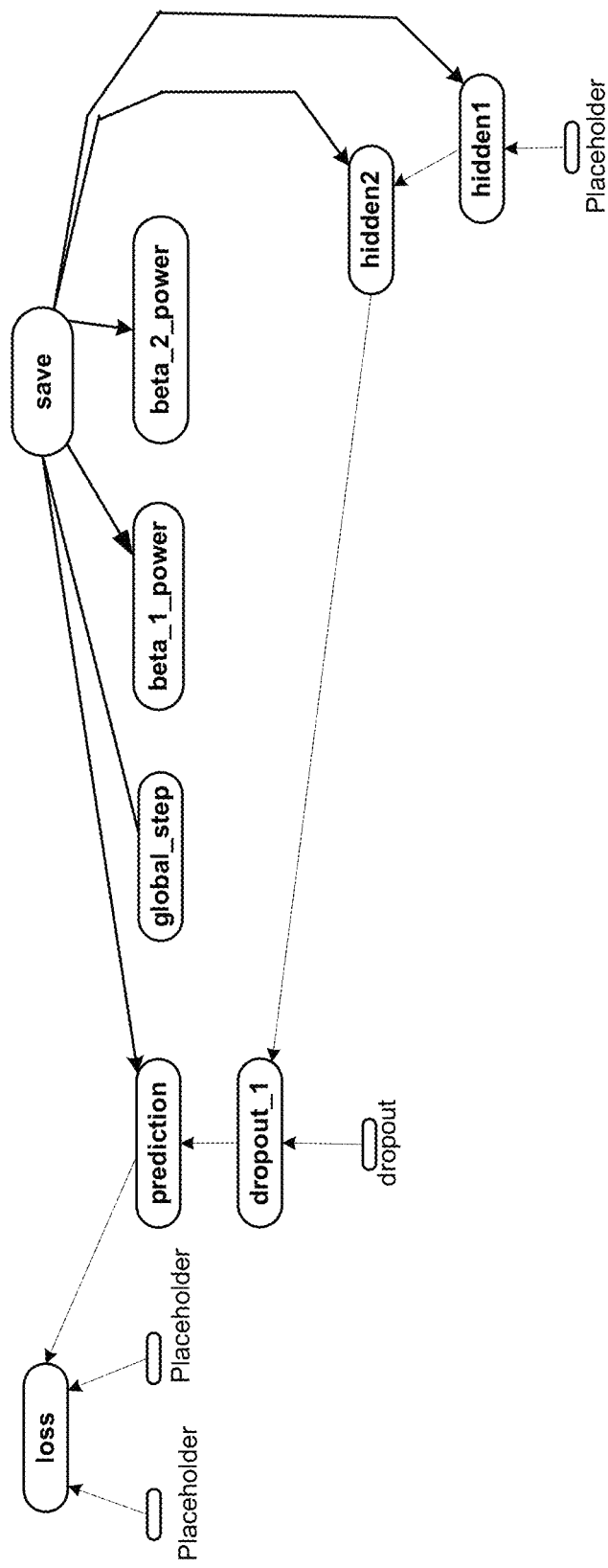
FIG. 4 is a schematic diagram illustrating DNN architecture constructed in TensorFlow framework according to aspects of the present disclosure.

For instance, the illustrative diagram of DNN architecture shown in FIG. 4 is based on TensorFlow framework. Those skilled in the art will readily appreciate that one particularly differentiating aspect of the methods according to the present disclosure is the use of DNN to estimate nonlinearity based on novel input features shown illustratively in FIG. 2.

At this point we note that a performance study using our AI-NLC method according to the present disclosure was conducted over 10800 km transmission link with following configuration: 180 spans of 60 km Ex3000 SMF fiber without inline dispersion compensation fiber. 7 Gbaud DP-16QAM with single-channel and 35 WDM channels at 7.2 GHz spacing. The parameter details of DNN architecture used in the simulation is the same as those shown in FIG. 4.

Figure 5:
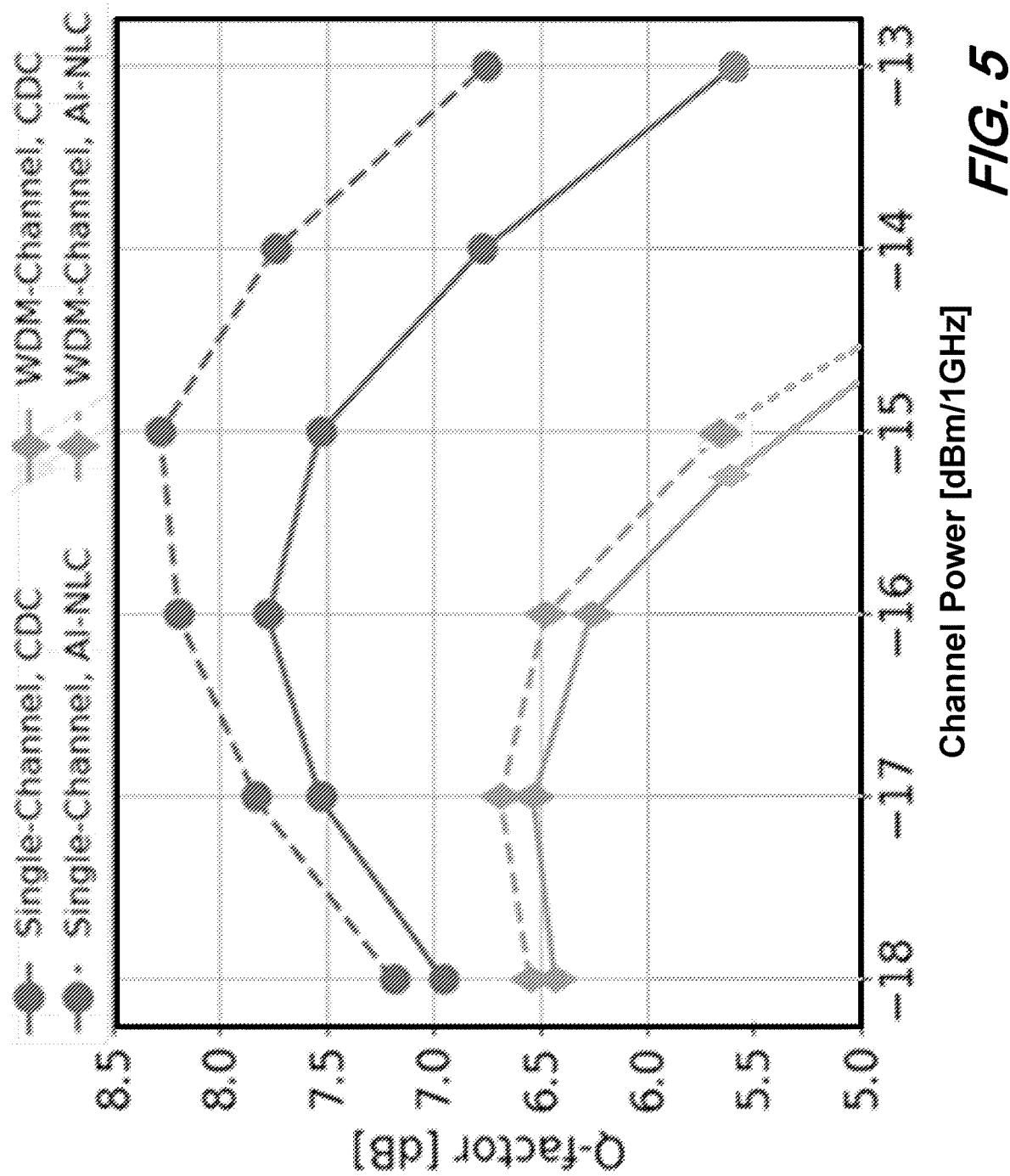
FIG. 5 is a plot illustrating simulated Q-performance of AI-NLC in 1080 km single mode fiber (SMF) link according to aspects of the present disclosure.

FIG. 5 is a graph illustrating a simulated Q performance of AI-NLC in 10800 km single mode fiber (SMF) link. As may be observed, ~0.55 dB and 0.2 dB Q improvement is observed, respectively, in single-channel and WDM channel configuration, thus suggesting the effectiveness of the proposed low-complexity single-step AI-NLC in any transmission system.

With these principles in place, we may now disclose an evolution of the longest segment of FASTER cable at 11,017 km, with 8QAM transponders at 4 b/s/Hz spectral efficiency (SE) in service. 6 b/s/Hz SE is further demonstrated as a valuable target for the next upgrade using probabilistically shaped 64QAM. In providing such evolution, we employ our nonlinearity compensation methods, where a neural network is trained by transmitting known but randomly generated patterns, and searching for the best node parameters that minimized the error between the transmitted and received symbols, resulting in the highest SEdistance product over live-traffic carrying cable, 66,102 b/s/Hz-km Illustrative Example Thanks to rapid development of coherent receivers, and digital signal processing, there have been massive upgrades to legacy submarine cables designed to support transponders with direct detection. Coherent technology enables evolution of modern cables too, as was demonstrated for the newly built FASTER cable, a transpacific cable designed specifically for coherent transponders. The longest segment of FASTER cable that connects Tanshui, Taiwan to Bandon, USA (TWN-USA) was initially designed at spectral efficiency (SE) of 2 b/s/Hz, and within few months upgraded to 3/b/s/Hz. Here we report that, less than 6 months later, a second upgrade increased the SE to 4 b/s/Hz using dual-carrier 300 Gb 8QAM modulation, carrying production traffic in a data center network.

Open cable concept pioneered with OSNR-based commissioning in FASTER, has a goal to improve return on investment by the simplification of the upgrade procedure. Generalized OSNR (G-OSNR) became community developed metrics, where nonlinear noise has an additive property. Nonlinearity compensation (NLC) introduces additional variable to change effective SNR.

We may now discuss results of an experimental investigation to find an upper limit of Trans-Pacific capacity, realistically achievable on FASTER with NLC. We quantify wetplant improvements through reduction of nonlinear noise and increase of SE. Offline field trials over dark fibers with new build cable with transpacific distance showed that the SE can be pushed further to 5.68 b/s/Hz, while measurements over straight line test bed showed 6.06 b/s/Hz over 10285 km, using truncated probabilistic shaped (PS)-64QAM, and NLC. Our offline testing over FASTER cable with PS-64QAM confirmed that 6 b/s/Hz is achievable with NLC, resulting in the highest SE-distance product over live-traffic carrying cable, 66,102 b/s/Hz-km. We also point on the growing complexity of DSP with larger baud-rates, especially at transoceanic distances. In implementing such improvements, we employed our novel, low-complexity, artificial-intelligence based NLC (AI-NLC) method based on building a black-box model of the transmission link using deep learning algorithms. As such, we confirm our approach by demonstrating a data-driven, working model of an open submarine cable used for the purpose of computationally efficient NLC.

Real-Time 300 G Transmission with 4 b/s/Hz SE

Figure 6A:
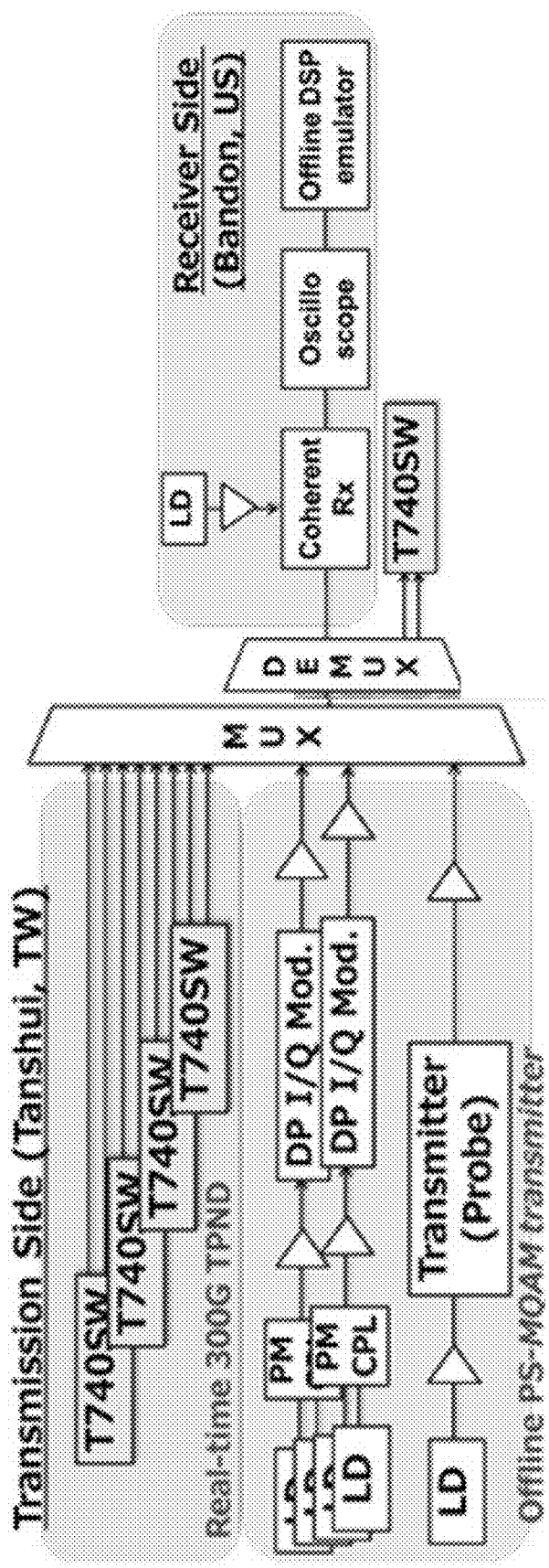
FIG. 6(A) is a schematic diagram illustrating a system setup for the 300 Gb/s upgrade pushing the SE to 4.0 b/s/Hz by using NEC's T740SW dual-carrier 300 Gb/s transponders at a channel spacing of 75 GHz according to aspects of the present disclosure.

FASTER holds the record for carrying live traffic over the longest distance (TWIN-USA) with 8QAM, at a SE of 3.0 b/s/Hz. FIG. 6(A) shows the system setup for the 300 Gb/s upgrade pushing the SE to 4.0 b/s/Hz by using NEC's T740SW dual-carrier 300 Gb/s transponders at a channel spacing of 75 GHz.

Figure 6B:
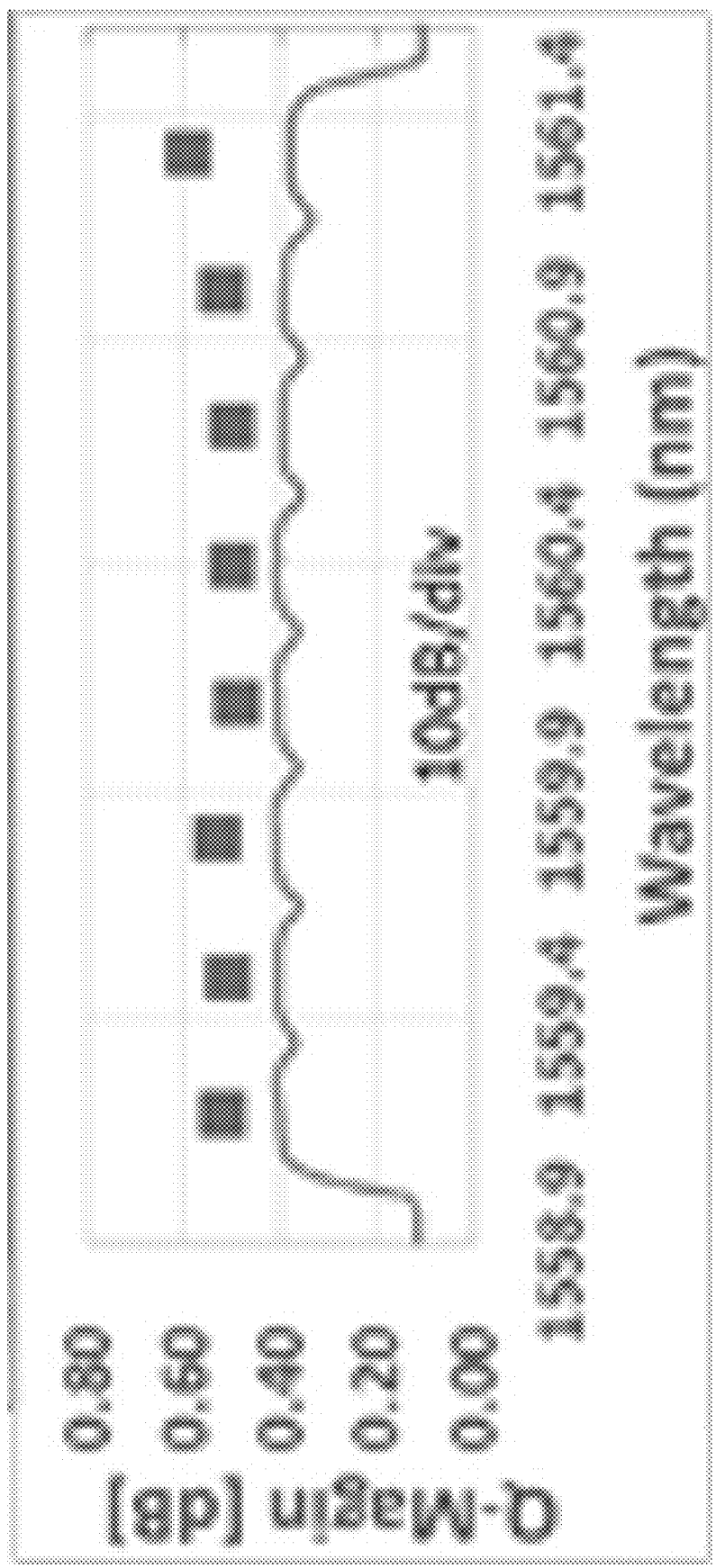
FIG. 6(B) is a plot that shows >0.5 dB Q margin over the FEC limit, equivalent to 0.7 dB SNR margin for the four 300 G channels at the nominal channel power, and the long-term Q-stability for the center 300 G channels are plotted in FIG. 1c with standard deviation <0.015 dB of Q according to aspects of the present disclosure.
Figure 6C:
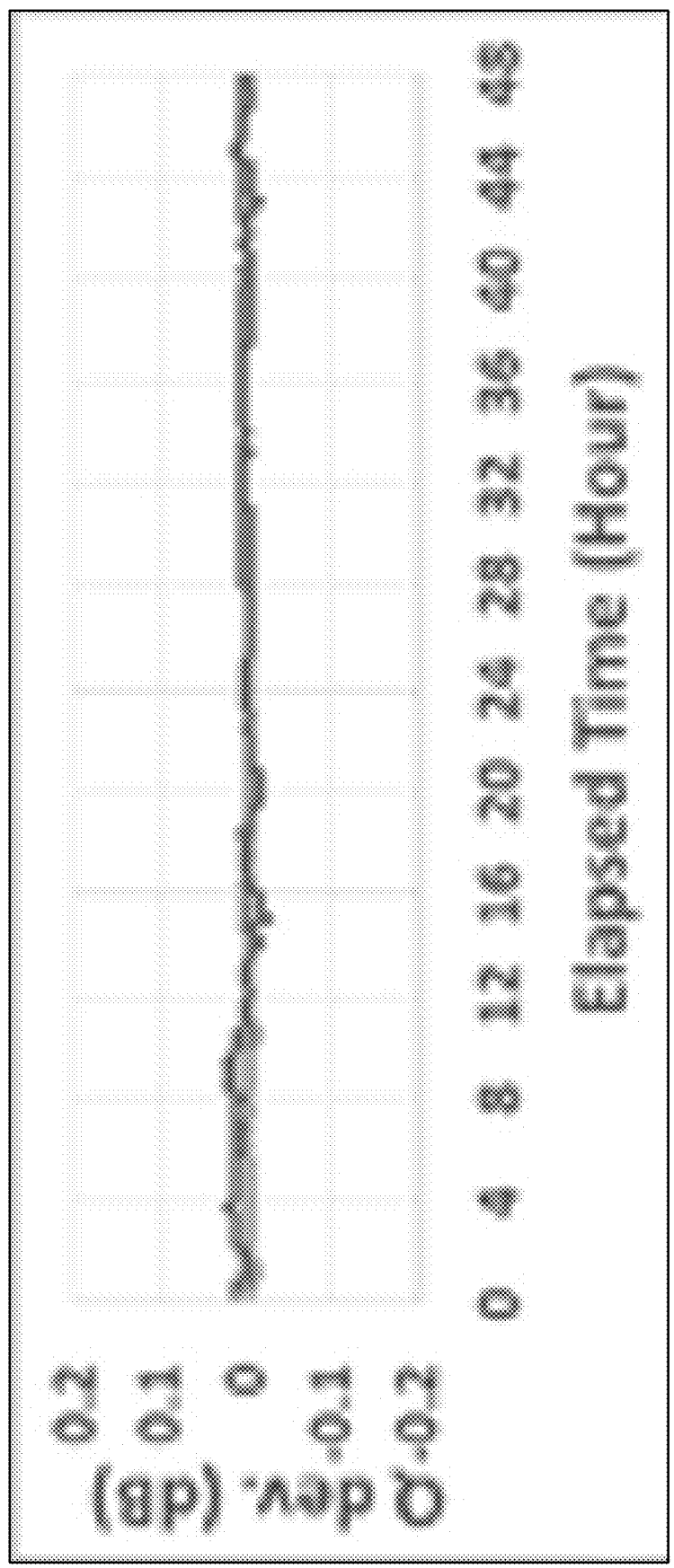
FIG. 6(C) is a plot that shows long-term Q-stability for the center 300 G channels with standard deviation <0.015 dB of Q according to aspects of the present disclosure.

FIG. 6(B) is a plot that shows >0.5 dB Q margin over the FEC limit, equivalent to 0.7 dB SNR margin for the four 300 G channels at the nominal channel power, and the long-term Q-stability for the center 300 G channels are plotted in FIG. 6(C) with standard deviation <0.015 dB of Q according to aspects of the present disclosure.

Improved SE and Data Rate Adaptation Via PS-64QAM

Those skilled in the art will readily appreciate that PS-64QAM is recognized as a Shannon capacity limit approaching modulation with a straightforward implementation of flexible data rate. Performance of PS-64QAM over FASTER cable is investigated in terms of achievable Q margin in the SE range 5 b/s/Hz to 6 b/s/Hz.

As noted above, FIG. 6(A), shows the schematic of the transmitter employed in this evaluation. The 49 Gbaud center probe signal is produced by a DP-IQ-modulator driven by 92 Gs/s AWG. A constant modulus distribution matcher is applied to the pseudo-random binary bits of $2^{31}-1$ to match the target data rate of PS-64QAM given by $R=2(H_p-6*(1-R_c))$.

A fixed regular binary QC-LDPC code rate $R_c=0.8$ is used in the evaluation. The entropy, $H_p$, at 250 Gb/, 275 Gb/s and 300 Gb/s data rate is 3.83 b/s, 4.091 b/s and 4.354 b/s. The four neighboring 50 GHz WDM odd/even channels are generated by two sets of independent AWG and DP-IQ modulator.

Figure 6D:
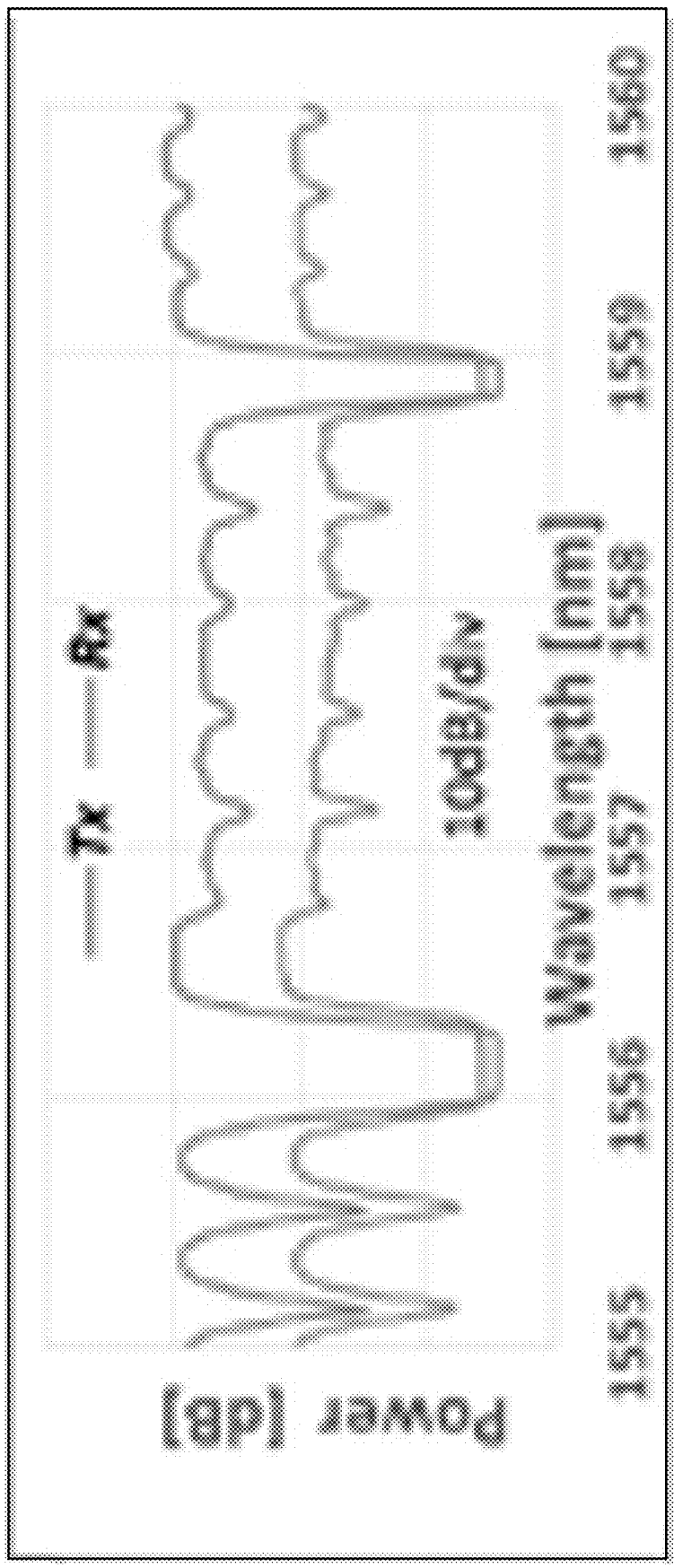
FIG. 6(D) is a plot showing signal spectra at the transmitter and receiver side for the offline setup according to aspects of the present disclosure.

FIG. 6(D) is a plot showing signal spectra at the transmitter and receiver side for the offline setup. The offline DSP algorithm uses 3% pilots to assist convergence of polarization de-multiplexing and carrier phase recovery before switching to decision-directed mode between the pilot frames. The blindly recovered data is fed to LDPC decoder and then distribution dematcher to ensure error-free binary bits stream.

Figure 9:
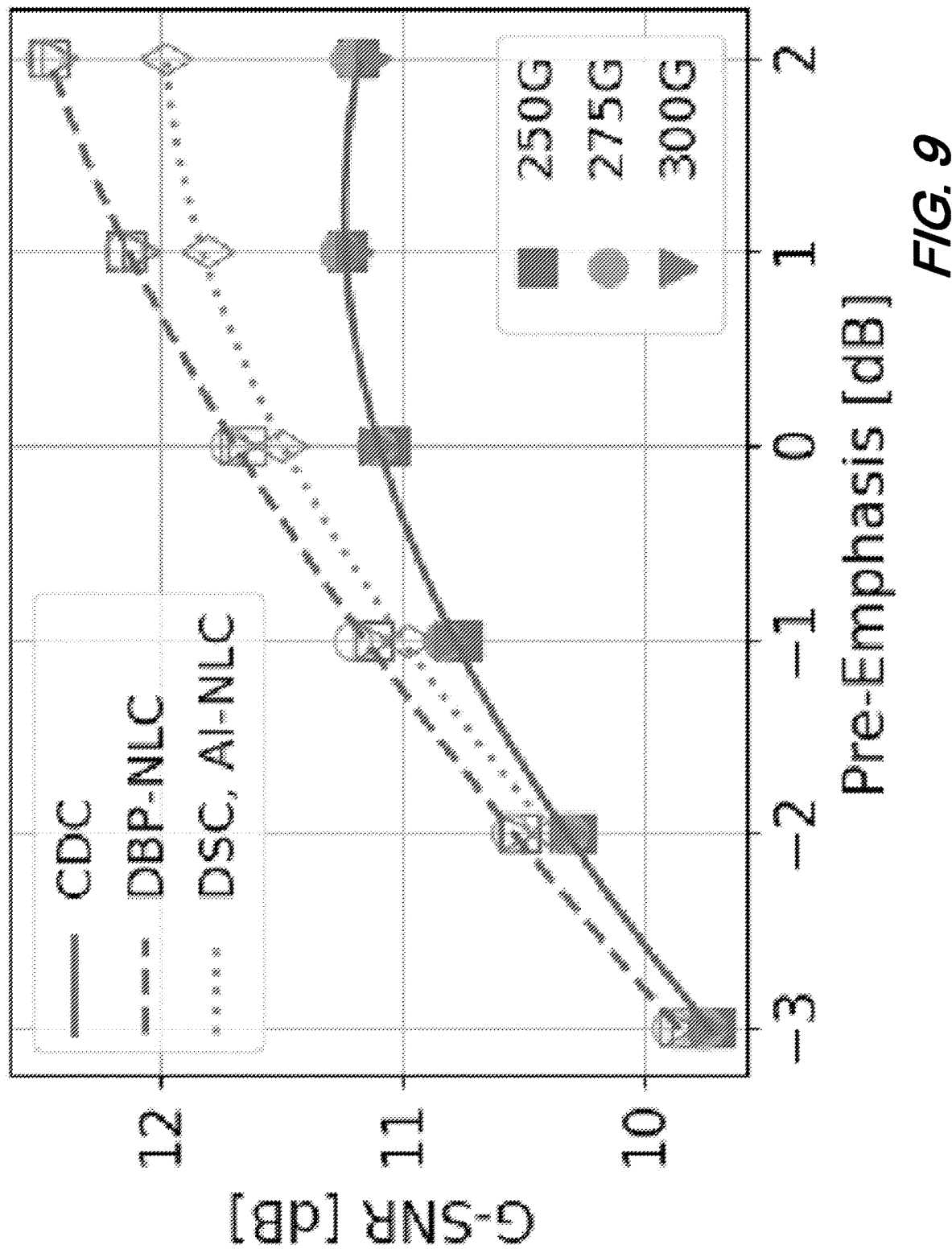
FIG. 9 is a graph of G-SNR vs relative channel power calculated from the received Q and the BTB Q—solid lines are for CDC only, dashed line is with DBP-NLC and dotted line is with AI-NLC—according to aspects of the present disclosure.

Q-factor performance of PS-64QAM is plotted in FIG. 9 against relative channel power with respect to the nominal channel power, together with the FEC limit at 5.0 dB. At the nominal channel power, PS-64QAM achieves 5.5 b/s/Hz SE with 0.45 dB margin without NLC, and 6 b/s/Hz with 0.25 dB margin with NLC.

Figure 7:
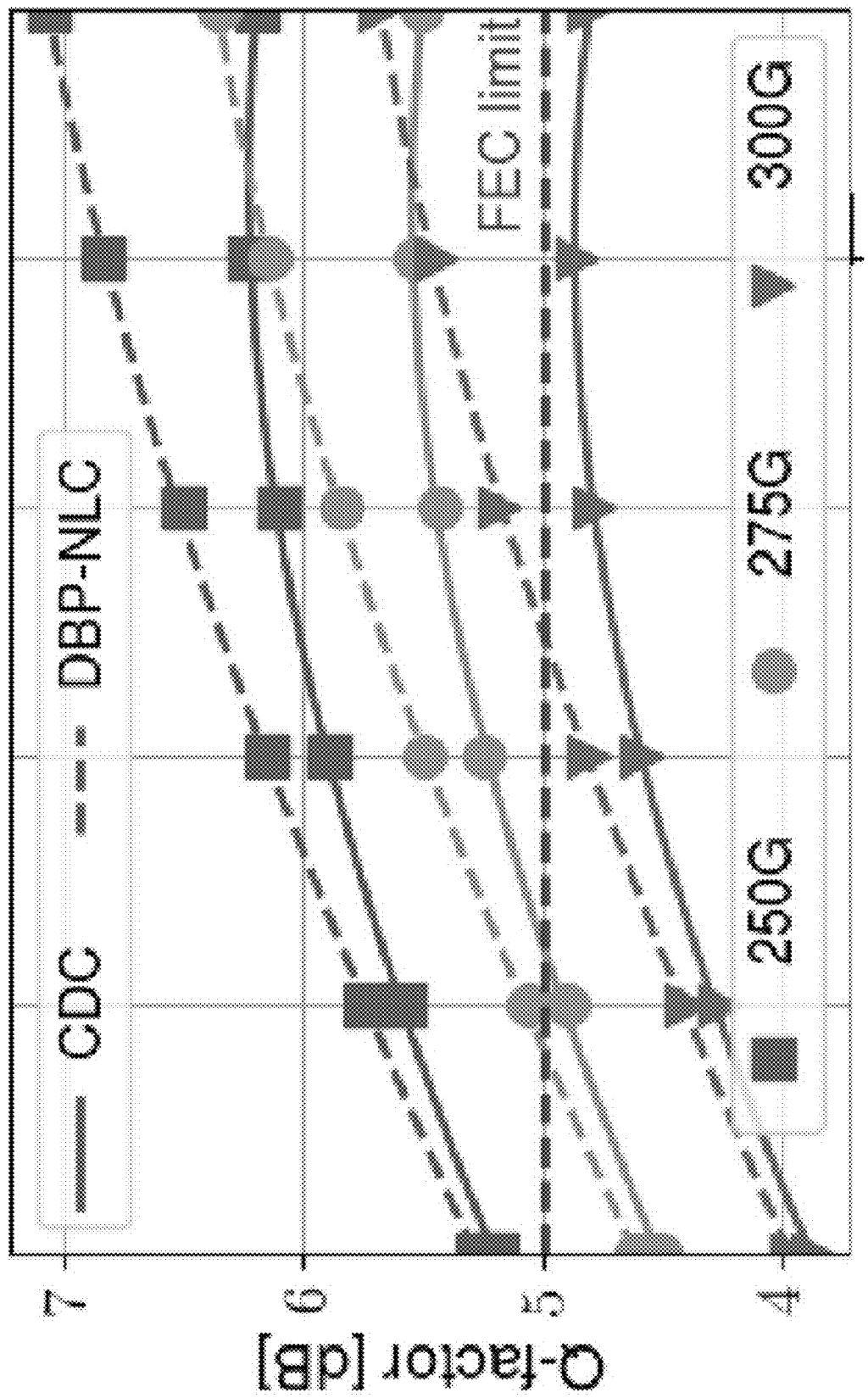
FIG. 7 is a plot showing Q-factor performance of PS-64QAM vs relative channel power with respect to the nominal channel power, together with the FEC limit at 5.0 dB according to aspects of the present disclosure.

In FIG. 7, NLC is implemented using digital back propagation method with 10 steps/span, to estimate the maximum possible improvement from NLC. It also emerges from the FIG. 7 that, roughly a 1 dB drop is expected in Q margin as SE increases by 0.5 b/s/Hz. The granularity of 25 Gb/s data rate is very appealing to maximize the cable capacity without significantly increasing cost to combine client data streams.

Figure 8:
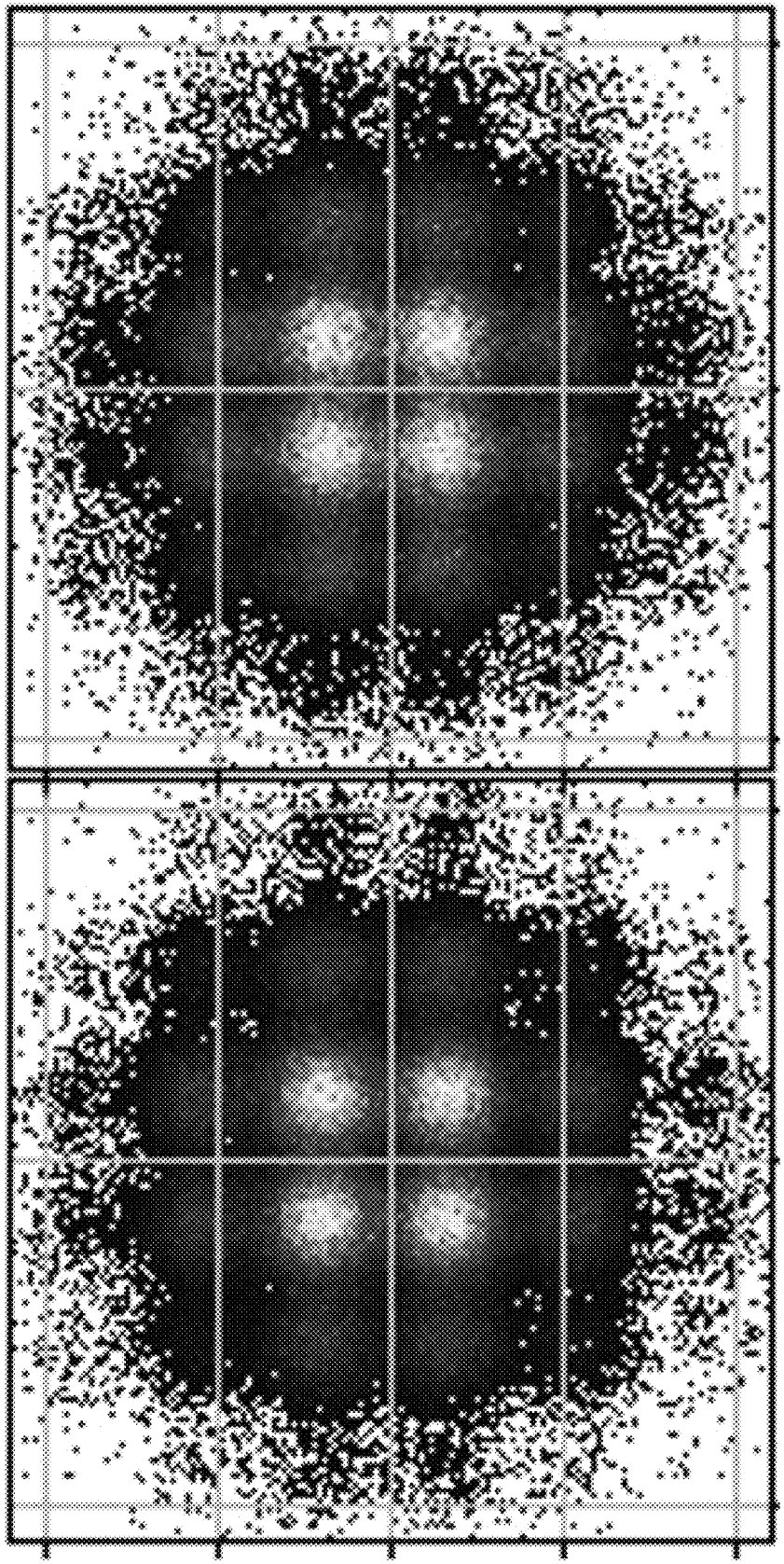
FIG. 8 is a constellation diagram for 250 Gb and 275 GB showing recovered constellation with CDC only according to aspects of the present disclosure.

The recovered constellation after 11017 km is plotted in FIG. 8. The Q values presented in FIG. 7 are converted to G-OSNR, which is considered a more intrinsic measure of ultimate capacity of the cable, and then plotted in FIG. 9. As expected, G-OSNR has little dependence on the data rate transmitted, whether NLC is applied or not. Even though, G-OSNR is supposed to be independent of the transponder, and presence of NLC alters G-OSNR, it continues fulfill its intended role, namely, given the GOSNR improvement through ideal NLC, different vendors can estimate the expected Q value after transmission with and without ideal NLC, and also with complexity efficient, but less effective than NLC algorithms such as our AI-based NLC.

Single-Step AI-NLC and Transmission Results

As previously noted, contemporary NLC methods are based on solving or approximating the solutions of the nonlinear Schrodinger equation with a trade-off between the required complexity and degree of nonlinearity compensation. According to aspects of the present disclosure—an alternative approach is to set aside the deterministic model of the transmission, and instead use the abundance of transmitted data to build a simpler yet effective model of the nonlinear transmission. We built such a model by training a deep neural network (DNN) with only 2 hidden layers consisting of 2, and 10 nodes. A dropout layer with probability of 0.5 is placed after the $2^{nd}$ hidden layer to avoid overfitting. The network is trained by transmitting known but randomly generated patterns and searching for the best node tensor parameters that minimized the mean square error between the transmitted and received symbols.

Figure 10:
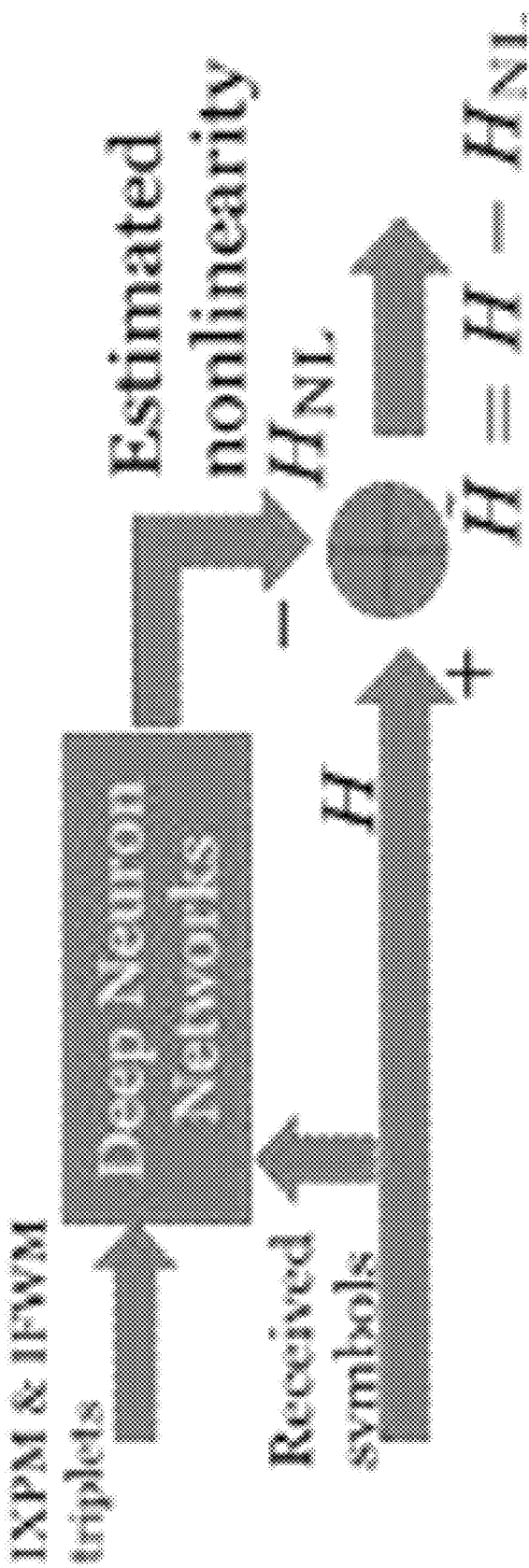
FIG. 10 is a block diagram illustrating our AI-NLC as employed in the evaluation according to aspects of the present disclosure.
Figure 11:
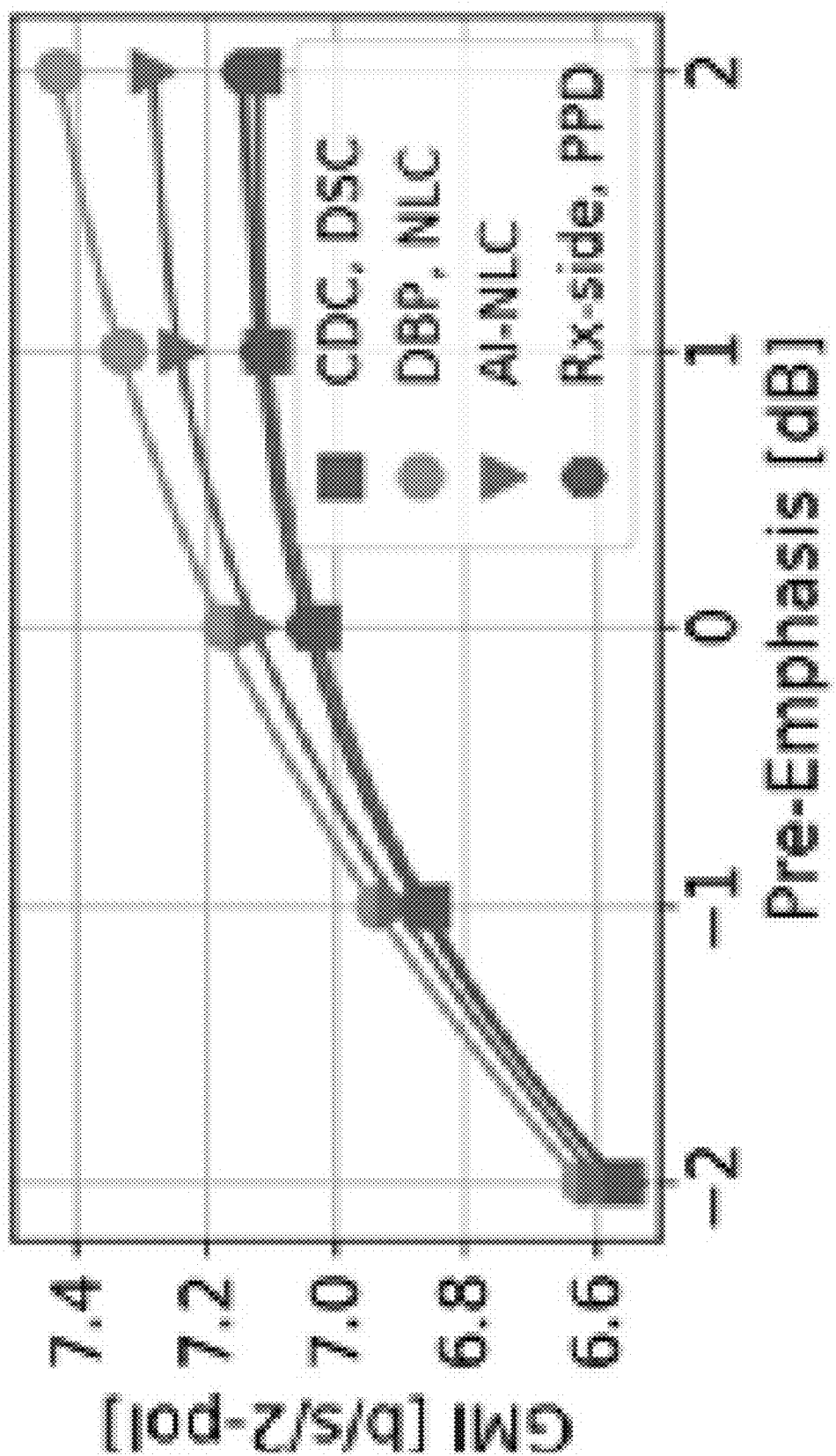
FIG. 11 is a graph showing experimental GMI of DSM PS-64QAM with CDC, DBP-NLC, AI-NLC and Rx-Side PPD according to aspects of the present disclosure.

Those skilled in the art will readily appreciate that one particular distinguishing aspect in our disclosed method as compared to previous, prior-art approaches that produced negligible benefits, or imposed large over-head—is the inclusion of intra-channel cross-phase (IXPM) modulation and intra-channel four-wave mixing (IFWM) triplets as defined in time-domain perturbation pre/post-distortion (PPD) algorithm in addition to the received symbols. The triplets provide the network with underlying physical processes that govern the nonlinear impairments. A simplified block diagram of the architecture is shown in FIG. 10.

For testing the AI-NLC, digital subcarrier modulation (DSM) 4×12.25 Gbaud PS-64QAM with 50 MHz guardband is used instead of a single-carrier modulation to carry in total 300 Gb/s. The lower baudrate of DSM reduces the complexity of the AI-NLC further by reducing the number of IXPM and IFWM triplets. The experimental GMI averaging over all four subcarriers in the independent test sets are plotted in FIG. 5 to demonstrate ~0.1 b/s/Hz GMI improvement over CDC case at the nominal channel power.

Note that there are two measured pattern sets with all four subcarriers used for training, and extra 7 measured pattern sets are used for testing, the AI-NLC is only performed once at the highest channel power. Each independent pattern set contains 4×40 k symbols, and 750 triplets were used in our experiments. In comparison, the receiver-side single-step PPD algorithm shows a negligible improvement. Note that the AI-NLC can achieve a gain almost as much as full DBP-NLC as shown in FIG. 10 but at a significantly lower complexity, while receiver-side PPD achieves none. All the subcarriers are recovered error-free after LDPC decoding after applying AI-NLC. Since PPD is more effective at the transmitter side, AI-NLC is compared to Tx-side PPD through simulations over 11,017 km.

Figure 12A:
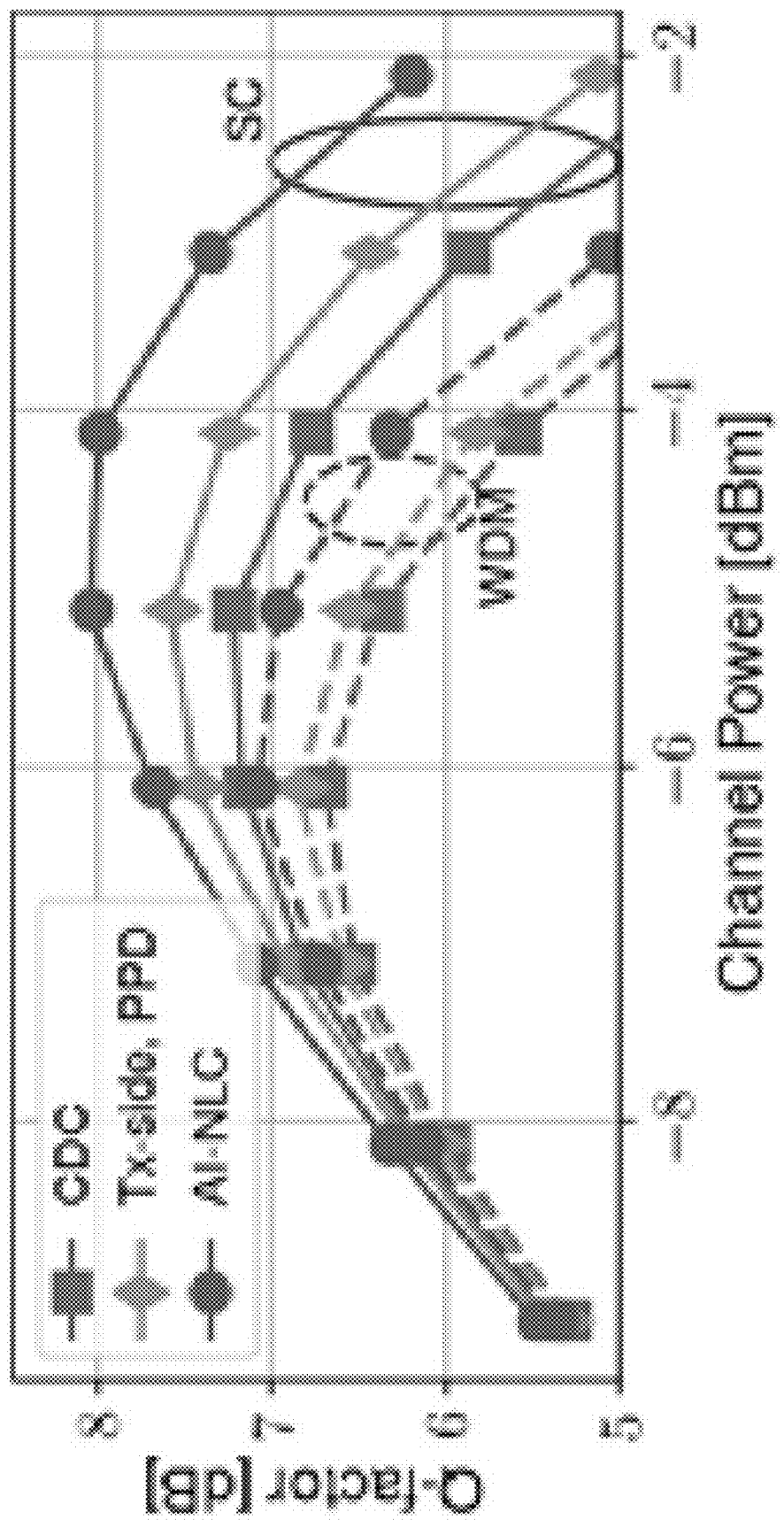
FIG. 12(A) is a graph showing performance against channel power and FIG. 12(B) is a graph showing NLC gain comparison vs the number of triplets in simulated single-channel and WDM 12.25 Gbaud 16 QAM between CDC, AI-NLC and TX-side PPD according to aspects of the present disclosure.
Figure 12B:
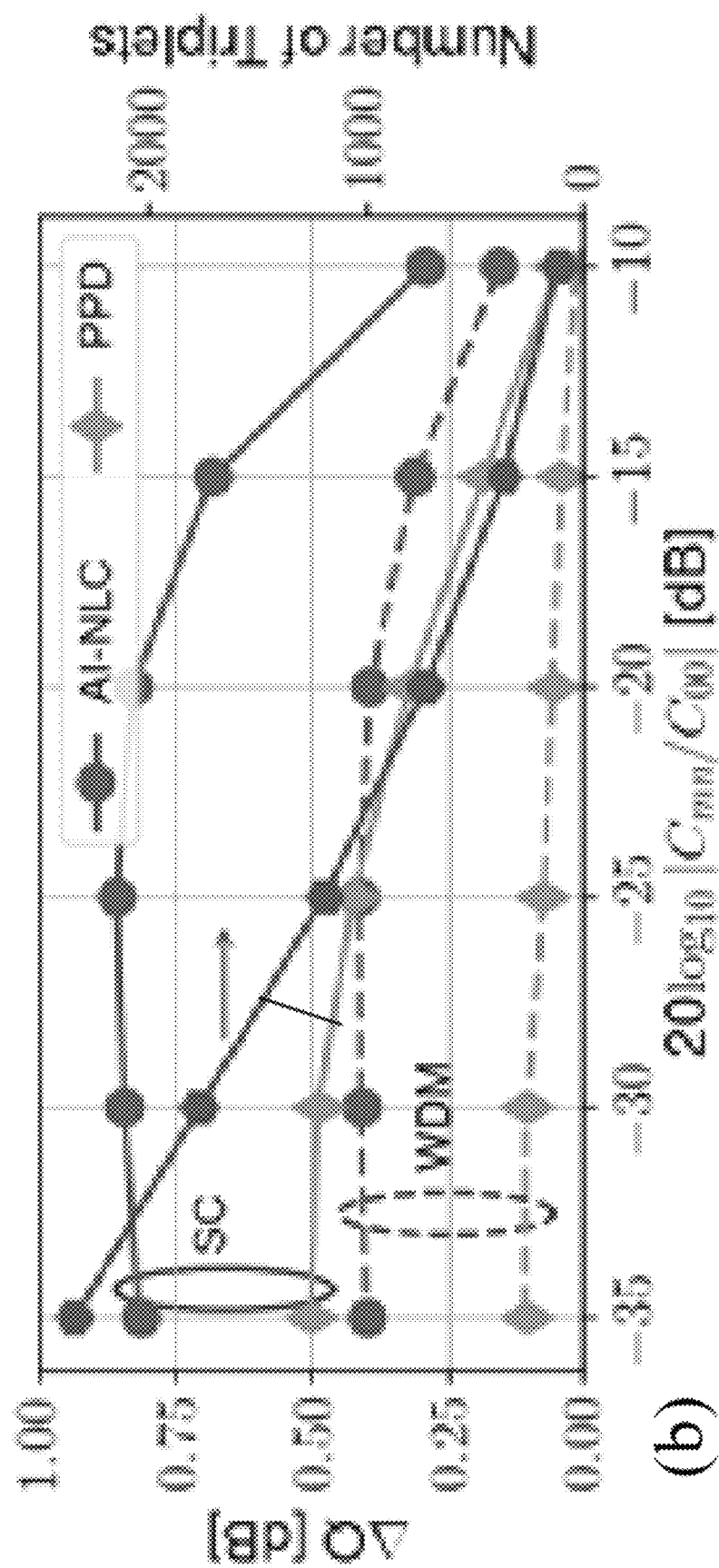

FIG. 12(A) shows the simulated Q-factor vs channel power for a single channel (SC) and WDM 37×12.25 Gbaud DP-16QAM at 12.5 GHz spacing. At the optimum channel power, AI-NLC outperforms CDC-only and Tx-side PPD by 0.8 dB and 0.3 dB at SC, and 0.4 dB and 0.3 dB at WDM, respectively. Since the major complexity of both AI-NLC and PPD are limited by the number of triplets, their Q-improvement is plotted in FIG. 12(B) against the selection criterion 20 $\log_{10}|C_{mn}C_{00}|$, where $C_{mn}$ denotes the coefficients in the PPD algorithm for the triplets between symbol m and n. At SC case, −30 dB selection criterion is required in Tx-side PPD to achieve ~0.5 dB Q improvement at the cost of ~1800 triplets. In contrast, AI-NLC only needs ~730 triplets to achieve ~0.8 dB NLC gain thanks to the self-learning algorithm in the DNN. The symbol window length L=51 in both experimental and simulation.

We note that since the AI model is data driven, it is completely system agnostic. Indeed, in this experiment the model was generated without feeding any of the typical transmission link parameters such as dispersion, fiber nonlinearity, fiber length, etc. The large gain in the case of the simulation confirms that the DDN is equalizing nonlinear penalty, rather than other unforeseen transmission related impairments.

Experimental Conclusion

As we have shown and described, the longest 11,017 km segment of FASTER open cable is upgraded to double the design capacity with 4 b/s/Hz spectral efficiency (SE), carrying production traffic based on 8QAM. Experimental investigation based on the offline field trial and simulations shows realistic target of SE=6 b/s/Hz for Trans-pacific cables with probabilistically shaped 64QAM. A data-driven nonlinear model of the cable is generated and tested through a deep-neural network architecture. We achieved what we believe today is the highest SE-distance product of 66,102 b/s/Hz-km At this point, while we have presented this disclosure using some specific examples, those skilled in the art will recognize that our teachings are not so limited. Accordingly, this disclosure should be only limited by the scope of the claims attached hereto.

The invention claimed is:

1. A nonlinearity compensation method for optical transmission systems for optical networks employing digital coherent receivers performing analog-to-digital conversion (A/D), synchronization and resampling, chromatic dispersion compensation (CD), polarization demultiplexing (PD), carrier phase recovery (CPR), and forward error correction decoding (FEC) operations, said method comprising:

performing, after the carrier phase recovery and before the forward error correction operation, an estimation of nonlinearity of received signals, wherein outputs of the carrier phase recovery operation are input to a deep neural network (DNN) to estimate the nonlinearity $H_{NL}$;

determining recovered symbol $\tilde{H}$ according to the following relationship:

$$\tilde{H}=H-H_{NL}$$

wherein $\tilde{H}$ is the recovered symbol, H is the received symbol, and $H_{NL}$ is the estimated nonlinearity of the received symbol as determined by the DNN;

wherein intra-channel cross-phase modulation (IXPM) and intra-channel four-wave-mixing (IFWM) triplets are computed from recovered symbols spanning a symbol window length L around a symbol of interest $H_0$ and the recovered symbols in the symbol window length L, together with the computed triplets are input to the DNN to estimate fiber nonlinearity of received signal $H_0$.

2. The method of claim 1 wherein there are in total $(3L^2+1)/4$ triplets computed.

* * * * *